(12) United States Patent
Sliwa et al.

(10) Patent No.: US 7,182,290 B2
(45) Date of Patent: Feb. 27, 2007

(54) METHODS AND SYSTEMS FOR STARTING PROPELLER-DRIVEN DEVICES

(75) Inventors: Steven M. Sliwa, White Salmon, WA (US); Andreas H. von Flotow, Hood River, OR (US); Brian D. Dennis, White Salmon, WA (US)

(73) Assignee: The Insitu Group, Inc., Bingen, WA (US)

( * ) Notice: Subject to any disclaimer, the term of this patent is extended or adjusted under 35 U.S.C. 154(b) by 54 days.

(21) Appl. No.: 10/976,566

(22) Filed: Oct. 29, 2004

(65) Prior Publication Data

US 2005/0093507 A1    May 5, 2005

Related U.S. Application Data

(60) Provisional application No. 60/517,160, filed on Nov. 3, 2003.

(51) Int. Cl.
*B64D 31/02* (2006.01)
(52) U.S. Cl. .............. 244/53 A; 416/2; 416/62
(58) Field of Classification Search ........... 244/53 A, 244/63; 416/2, 62; 320/101
See application file for complete search history.

(56) References Cited

U.S. PATENT DOCUMENTS

| | | | |
|---|---|---|---|
| 965,881 A | 8/1910 | Draper |
| 968,339 A | 8/1910 | Geraldson |
| 975,953 A | 11/1910 | Hourwich |
| 1,144,505 A | 6/1915 | Steffan |
| 1,164,967 A | 12/1915 | Thorp |
| 1,317,631 A | 9/1919 | Kinser |
| 1,383,595 A | 7/1921 | Black |
| 1,384,036 A | 7/1921 | Anderson |
| 1,428,163 A | 9/1922 | Harriss |
| 1,499,472 A | 7/1924 | Pratt |
| 1,530,010 A | 3/1925 | Neilson |
| 1,556,348 A | 10/1925 | Ray et al. |
| 1,624,188 A | 4/1927 | Simon |
| 1,634,964 A | 7/1927 | Steinmetz |
| 1,680,473 A | 8/1928 | Parker |
| 1,686,298 A | 10/1928 | Uhl |

(Continued)

FOREIGN PATENT DOCUMENTS

DE    4301671 A1  A1    7/1993

(Continued)

OTHER PUBLICATIONS

U.S. Appl. No. 10/808,725, McGeer et al.

(Continued)

*Primary Examiner*—Rob Swiatek
(74) *Attorney, Agent, or Firm*—Perkins Coie LLP

(57) ABSTRACT

Methods and systems for starting propeller driven aircraft and other devices are disclosed. A system in accordance with one embodiment of the invention includes a removable fixture that is coupled to the propeller and has at least one portion exposed to a flowstream to rotate the propeller during engine start-up. The fixture is configured to separate from the propeller after the engine begins to turn over (e.g., after the engine starts and/or rotates above a threshold rate). Accordingly, the system can include a releasable link between the fixture and the propeller.

46 Claims, 7 Drawing Sheets

U.S. PATENT DOCUMENTS

| | | | |
|---|---|---|---|
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,756,747 A | 4/1930 | Holland |
| 1,777,167 A | 9/1930 | Forbes |
| 1,816,976 A | 8/1931 | Kirkham |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,333,559 A | 11/1943 | Grady et al. |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,435,197 A | 2/1948 | Brodie |
| 2,436,240 A | 2/1948 | Wiertz |
| 2,448,209 A | 8/1948 | Boyer et al. |
| 2,465,936 A | 3/1949 | Schultz |
| 2,488,050 A | 11/1949 | Brodie |
| 2,515,205 A | 7/1950 | Fieux |
| 2,526,348 A | 10/1950 | Gouge |
| 2,669,403 A | 2/1954 | Milligan |
| 2,735,391 A | 2/1956 | Buschers |
| 2,814,453 A | 11/1957 | Trimble et al. |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koelsch |
| 3,069,118 A | 12/1962 | Bernard |
| RE25,406 E | 6/1963 | Byrne et al. |
| 3,163,380 A | 12/1964 | Brodie |
| 3,268,090 A | 8/1966 | Wirkkala |
| 3,454,244 A | 7/1969 | Walander |
| 3,468,500 A | 9/1969 | Carlsson |
| 3,484,061 A | 12/1969 | Niemkiewicz |
| 3,516,626 A | 6/1970 | Strance et al. |
| 3,684,219 A | 8/1972 | King |
| 3,708,200 A | 1/1973 | Richards |
| 3,765,625 A | 10/1973 | Myhr et al. |
| 3,827,660 A | 8/1974 | Doolittle |
| 3,939,988 A | 2/1976 | Wellman |
| 3,943,657 A | 3/1976 | Leckie |
| 3,980,259 A | 9/1976 | Greenhalgh et al. |
| 4,067,139 A | 1/1978 | Pinkerton et al. |
| 4,079,901 A | 3/1978 | Mayhew et al. |
| 4,143,840 A | 3/1979 | Bernard et al. |
| 4,147,317 A | 4/1979 | Mayhew et al. |
| D256,816 S | 9/1980 | McMahon et al. |
| 4,236,686 A | 12/1980 | Barthelme et al. |
| 4,238,093 A | 12/1980 | Siegel et al. |
| 4,279,195 A | 7/1981 | Miller |
| 4,296,894 A | 10/1981 | Schnabele et al. |
| 4,296,898 A | 10/1981 | Watson |
| 4,311,290 A | 1/1982 | Koper |
| 4,408,737 A | 10/1983 | Schwaerzler |
| 4,410,151 A | 10/1983 | Hoppner et al. |
| 4,471,923 A | 9/1984 | Hoppner et al. |
| 4,523,729 A | 6/1985 | Frick |
| 4,566,658 A | 1/1986 | Di Giovanniantonio et al. |
| 4,678,143 A | 7/1987 | Griffin |
| 4,730,793 A | 3/1988 | Thurber, Jr. et al. |
| 4,753,400 A | 6/1988 | Reuter et al. |
| 4,809,933 A | 3/1989 | Buzby et al. |
| 4,842,222 A | 6/1989 | Baird |
| 4,909,458 A | 3/1990 | Martin |
| 4,979,701 A | 12/1990 | Colarik et al. |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor |
| 5,109,788 A | 5/1992 | Heinzmann |
| 5,119,935 A | 6/1992 | Stump et al. |
| 5,253,605 A | 10/1993 | Collins |
| 5,253,606 A | 10/1993 | Ortelli |
| 5,509,624 A | 4/1996 | Takahashi |
| 5,583,311 A | 12/1996 | Rieger |
| 5,655,944 A | 8/1997 | Fusselman |
| 5,687,930 A | 11/1997 | Wagner et al. |
| 5,906,336 A | 5/1999 | Eckstein |
| 6,015,261 A * | 1/2000 | Barone ...................... 416/62 |
| 6,264,140 B1 | 7/2001 | McGeer et al. |
| 6,457,673 B1 | 10/2002 | Miller |
| 6,478,650 B1 | 11/2002 | Tsai |
| 6,835,045 B1 | 12/2004 | Barbee et al. |
| 2002/0100838 A1 | 8/2002 | McGeer et al. |
| 2003/0222173 A1 | 12/2003 | McGeer et al. |
| 2004/0232282 A1 | 11/2004 | Dennis |
| 2005/0133665 A1 | 6/2005 | Dennis et al. |

FOREIGN PATENT DOCUMENTS

| | | |
|---|---|---|
| FR | 854371 | 4/1940 |
| GB | 2 080 216 A | 2/1982 |
| GB | 2 150 895 A | 7/1985 |
| GB | 2 219 777 A | 12/1989 |
| JP | 07-304498 | 11/1995 |
| WO | WO 00/75014 A1 A1 | 12/2000 |
| WO | WO 01/07318 A1 A1 | 2/2001 |

OTHER PUBLICATIONS

U.S. Appl. No. 10/760,150, Roseler et al.
U.S. Appl. No. 10/759,742, Dennis.
U.S. Appl. No. 10/759,545, Dennis et al.
U.S. Appl. No. 10/759,541, McGeer.
U.S. Appl. No. 10/758,956, Dennis et al.
U.S. Appl. No. 10/758,955, McGeer et al.
U.S. Appl. No. 10/758,948, Dennis et al.
U.S. Appl. No. 10/758,943, Dennis et al.
U.S. Appl. No. 10/813,906, Roeseler.
Robinson, Russell Norman, "Dynamic Analysis of a Carousel Remotely Piloted Vehicle Recovery System," master's thesis, Naval Post-Graduate School, Monterey, California, Dec. 1977, Thesis No. ADA052401.
Dickard, H. E. "Mini-RPV Recovery System Conceptual Study," final report, U. S. Army Air Mobility Research and Development Laboratory, Fort Eustis, Virginia, Aug. 1977, Contract DAAJ02-76-C-0048, Report No. USAAMRDL-TR-77-24.
Whitmore, Stephen A. et al., "Development of a Closed-Loop Strap Down Attitude System for a Ultrahigh Altitude Flight Experiment," technical memorandum, NASA Dryden Flight Research Center, Edwards, California, Jan. 1997, Report No. NASA TM-4775.
U.S. Appl. No. 10/759,742, filed Jan. 16, 2004, Dennis.
"Ames Builds Advanced Yawed-Wing RPV," Aviation Week and Space Technology, Jan. 22, 1973, p. 73.
International Search Report dated May 12, 2006 for corresponding PCT Application No. PCT/US2004/036349.

* cited by examiner

METHODS AND SYSTEMS FOR STARTING PROPELLER-DRIVEN DEVICES

CROSS-REFERENCE TO RELATED APPLICATION

The present application claims priority to U.S. Provisional Application 60/517,160 filed Nov. 3, 2003 and incorporated herein in its entirety by reference.

TECHNICAL FIELD

The present invention is directed to methods and systems for starting propeller-driven devices, for example, aerially starting propeller-driven aircraft.

BACKGROUND

Some propeller-driven aerial devices such as airplanes, unmanned aerial vehicles (UAVs), and missiles are deployed by launching them into the air from the ground, sea, an airplane, a balloon, or a missile. These devices typically include reciprocating engines, which power the propeller. The reciprocating engines are typically started with a starter, which may be heavy, complex and requires a functioning and charged battery.

Propellers are typically optimized for cruise flight. Accordingly, the aerodynamic configuration of the propeller does not generate large torques when the propeller is not spinning and air is flowing across it at relatively low velocities. Reciprocating engines typically have static friction, sliding friction, and compression resistance, all of which must be overcome before the engine begins to reciprocate. However, a propeller that is optimized to generate sufficient starting torque (e.g., while the air is flowing past it as the vehicle is gliding or falling) will not be efficient during cruise flight or when performing other operations requiring it to propel the vehicle. In one case, the propeller is extracting energy from the air (i.e., serving as a windmill) and in the other case the propeller is adding energy to air as a means of providing a propulsive force for the vehicle.

One approach to addressing the foregoing problem is to outfit the propeller with a variable pitch mechanism that encourages the propeller to windmill. The variable pitch mechanism adjusts the propeller angle of attack relative to the air impacting the propeller. If the variable pitch mechanism has sufficient range of operation, the propeller can be set to create large starting torques during engine start, and then adjusted to provide an efficient propulsive force during cruise and maneuvers. However, the variable pitch mechanism may be heavy, complex, and may reduce reliability. Accordingly, both the battery/starter approach and the variable pitch propeller approach add weight (which is at a premium for operations), cost, complexity, and unreliability to the aerial device.

In still another approach, fixed-pitch propellers can sometimes start an unstarted reciprocating engine if the vehicle dives at a high enough speed during the starting process. However, this method is unreliable and may require very high speeds to enable starting. High dive speeds can increase the structural weight and material strength requirements of the vehicle wings to prevent them from breaking or fluttering or both.

SUMMARY

The present invention is directed generally toward methods and systems for starting propeller-driven devices. An apparatus in accordance with one aspect of the invention includes a removable fixture configured to be coupled to an engine-driven propeller. The fixture can include at least one portion (e.g., a vane portion) positioned to extract energy from an adjacent flow stream. At least one link can be configured to releasably couple the vane portion to the propeller to rotate the propeller during engine start-up. The link can be configured to separate the vane portion from the propeller when the propeller rotates. For example, the link can be configured to break under a threshold tensile force and/or shear force. In particular aspects of the invention, the link can be configured to break under a centrifugal force when the propeller spins above a threshold speed. In further particular embodiments, the fixture can be installed on a propeller-driven vehicle, for example, an unmanned aircraft.

Other aspects of the invention are directed to methods for starting an engine coupled to a propeller. One such method includes rotating the propeller by exposing a starting fixture releasably coupled to the propeller to an adjacent fluid stream. The method can further include releasing the starting fixture from the propeller after an engine coupled to the propeller begins to turn over. Releasing the fixture can include increasing a tensile force placed on a frangible link coupling the fixture to the propeller by increasing a rotation speed of the fixture, breaking the frangible link, and allowing the fixture to release from the propeller in a generally radial direction. The method can further include starting the engine before releasing the starting fixture.

DETAILED DESCRIPTION

The following disclosure describes methods and systems for starting propeller-driven devices, for example, aerially launched unmanned air vehicles (UAVs). Certain specific details are set forth in the following description and the Figures to provide a thorough understanding of various embodiments of the invention. Certain well-known details often associated with aircraft, propellers and engines are not set forth in the following disclosure, however, to avoid unnecessarily obscuring the various embodiments of the invention. Further, those of ordinary skill in the relevant art will understand that they can practice other embodiments of the invention without several of the details described below.

Figure 1:
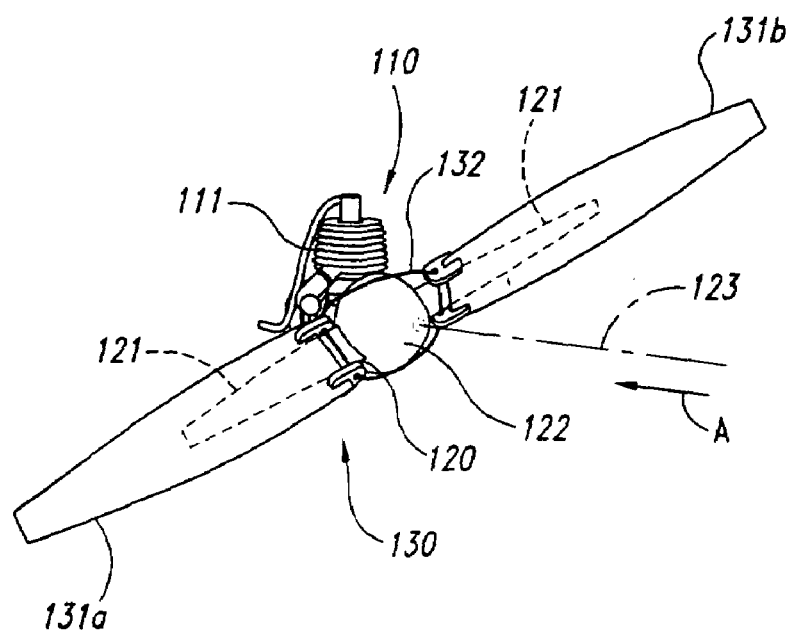
FIG. 1 illustrates a reciprocating engine having a fixed-pitch, two-bladed, propeller and a removable fixture in accordance with one embodiment of the invention.

FIG. 1 shows an engine 110 having a fixture 130 mounted to a propeller 120 in accordance with one embodiment of the invention. The engine 110 can be a reciprocating engine (as shown in FIG. 1) or another type of engine (e.g., a rotary engine or turbine engine). The engine 110 is shown with a fixed-pitch propeller 120 having two blades 121 mounted to a hub 122. The fixture 130 has two portions 131 (shown as a first portion 131a and a second portion 131b), each of which can slip over one of the propeller blades 121, in the manner of a glove. The portions 131a, 131b can be secured to each other with a link 132 (e.g., a frangible link). Each portion 131 can have an aerodynamic shape such that while the fixture 130 is not turning and air flows over it, it generates a large amount of torque around a rotation axis 123. As the engine 110, the propeller 120, and the fixture 130 are dragged, glided, pushed or otherwise propelled through the adjacent air, the fixture 130 and propeller 120 start to rotate as a unit, causing the engine 110 to start turning over (i.e., reciprocating). Once the engine 110 starts to turn over (e.g., in excess of a first pre-selected rotation rate), fuel can be added to a combustion chamber 111 and the engine 110 can be started. The amount of torque needed to keep turning the engine 110 over is reduced once the engine 110 starts to rotate. In this embodiment, the fixture 130 added to the propeller 120 is longer than the propeller 120 and has a shape rotated into the incoming airstream (indicated by arrow A) to generate torque at moderate forward velocities.

Figure 2:
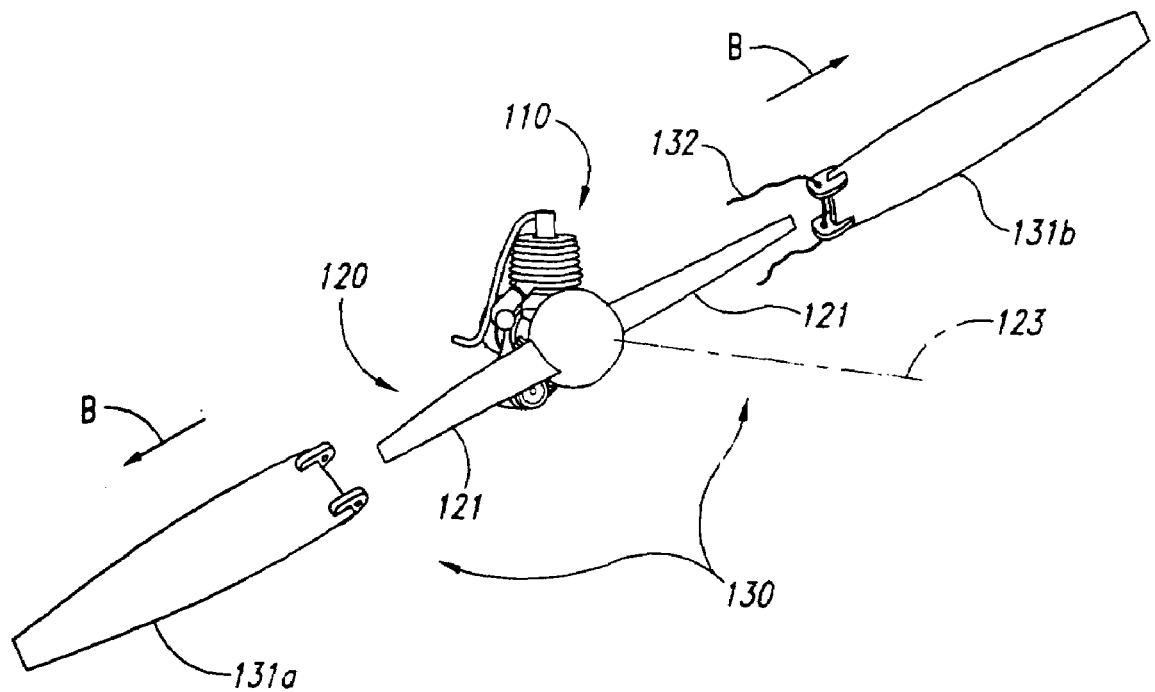
FIG. 2 illustrates the fixture as it is jettisoned in accordance with an embodiment of the invention.

If the fixture 130 were left in place for a significant period of time after the engine 110 started, it would render the propeller 120 inefficient by increasing its drag and weight and reducing its thrust (though providing it with good low-speed starting torque). FIG. 2 shows one method for discarding the fixture 130 after the engine 110 starts in accordance with an embodiment of the invention. After the engine 110 starts, the engine revolutions per minute (RPM) increases rapidly. As the rotation rate of the engine 110 increases, the radial forces on the fixture portions 131 increase. In fact, the forces on the portions 131 are proportional to the square of the rotation rate times the mass of the portions 131 times the radial distance between the portions 131 and the axis 123 about which they rotate. Accordingly, the forces on the portions 131 grow rapidly with increasing engine RPM. When the forces exceed a preselected threshold level (corresponding to a second threshold rotation rate), the frangible link 132 breaks, releasing the fixture 130, as described below.

In an embodiment shown in FIG. 2, the frangible link 132 includes a wire, string, or other mechanical element. For example, the frangible link 132 can include a composite material, a plastic, or a metallic wire. In other embodiments, the frangible link 132 includes other materials. In any of these embodiments, the frangible link 132 (or at least a portion of it) has a pre-determined breaking strength such that it will break at a pre-selected engine RPM. In another embodiment, one or more portions of the frangible link 132 are deliberately made weaker than the rest, for example, by notching the frangible link 132. In still further embodiments, the fixture portions 131 can be secured with a releasable link 132 that is not necessarily frangible (e.g., a pair of magnets attracted to each other with a magnetic force that is at the preselected threshold level).

In one embodiment, the frangible link 132 can be configured to break once the engine 110 reaches an appropriate idle speed. Alternatively, the frangible link 132 can be configured to break at a higher RPM so that the operation of the engine 110 above idle causes the frangible link 132 to break. In still another embodiment, the frangible link 132 can be configured to break at an RPM that is lower than idle (and, in a particular embodiment, prior to the engine 110 starting), but at an RPM high enough that the propeller 120 will continue to turn without the fixture 130 (e.g., by windmilling).

In an embodiment shown in FIG. 2, the fixture portions 131 exit radially, as indicated by arrows B. In particular, the position, size and configuration of the fixture 130, the engine 120, and the aircraft (not shown in FIG. 2) to which they are attached, are selected so that when the portions 131 exit radially, they do not hit any part of the aircraft. Because the fixture portions 131 are fastened with a common mechanical element (e.g., the frangible portion of the link 132), when the link 132 breaks, both portions 131 exit radially and simultaneously.

Figure 3:
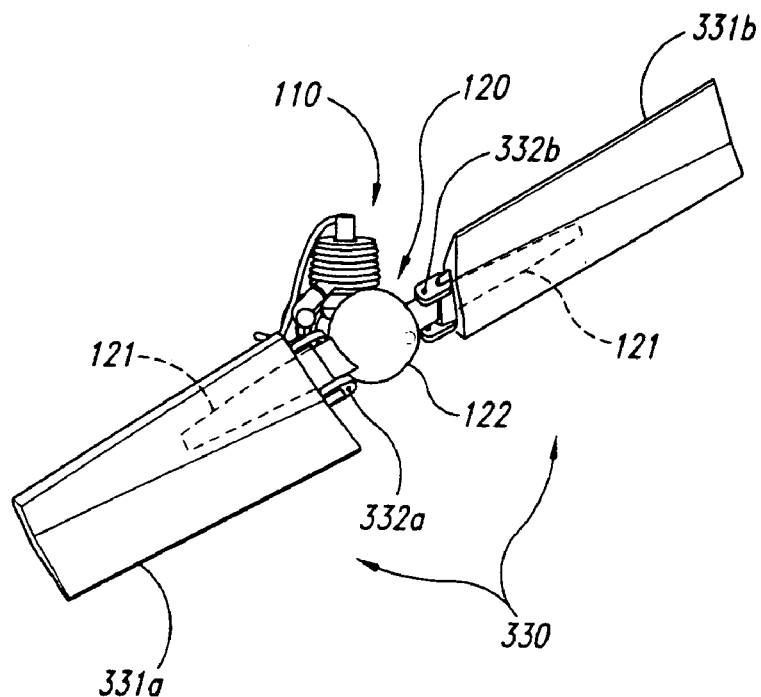
FIG. 3 illustrates a removable fixture sized and shaped in accordance with another embodiment of the invention.

One feature of an embodiment of the fixture 130 described above is that it can have roughly the same overall shape as the propeller blades 121 (through the pitch of each fixture portion 131 differs from the pitch of the corresponding blade 121). Accordingly, an aspect ratio of each fixture portion 131 (e.g., a ratio of radial extent to circumferential extent) can be roughly the same as an aspect ratio of the corresponding blade 121. In other embodiments, these ratios can differ. For example, FIG. 3 shows a fixture 330 that is much larger than the propeller blades 121, and has a significantly different aspect ratio in accordance with another embodiment of the invention. In one aspect of this embodiment, the fixture 330 includes two portions 331 (shown as a first portion 331a and a second portion 331b), each of which has a paddle shape. This configuration can generate a very large starting torque. Each portion 331 can be attached to the propeller 120 with a separate frangible link (shown as a first link 332a and a second link 332b), rather than a single link. The links 332a, 332b can include studs, bolts or other fasteners having at least a portion configured to fail (e.g., shear off) at a pre-selected engine RPM.

Figure 4:
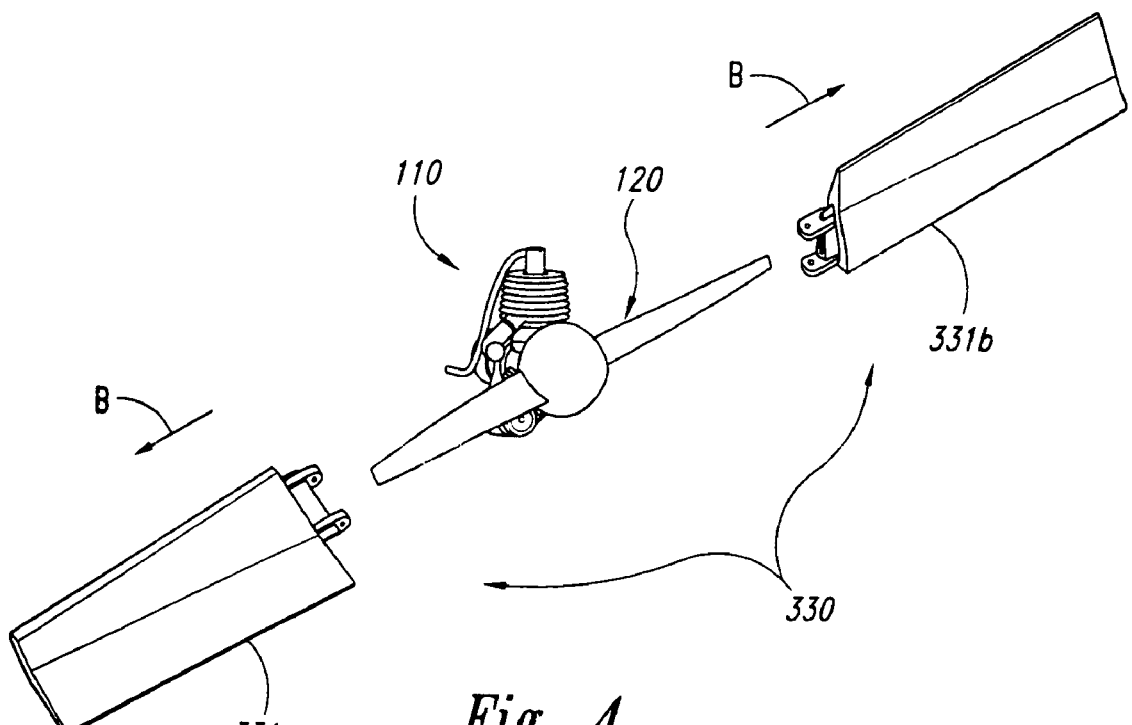
FIG. 4 illustrates the fixture shown in FIG. 3 as it is jettisoned after frangible links have broken.
Figure 5:
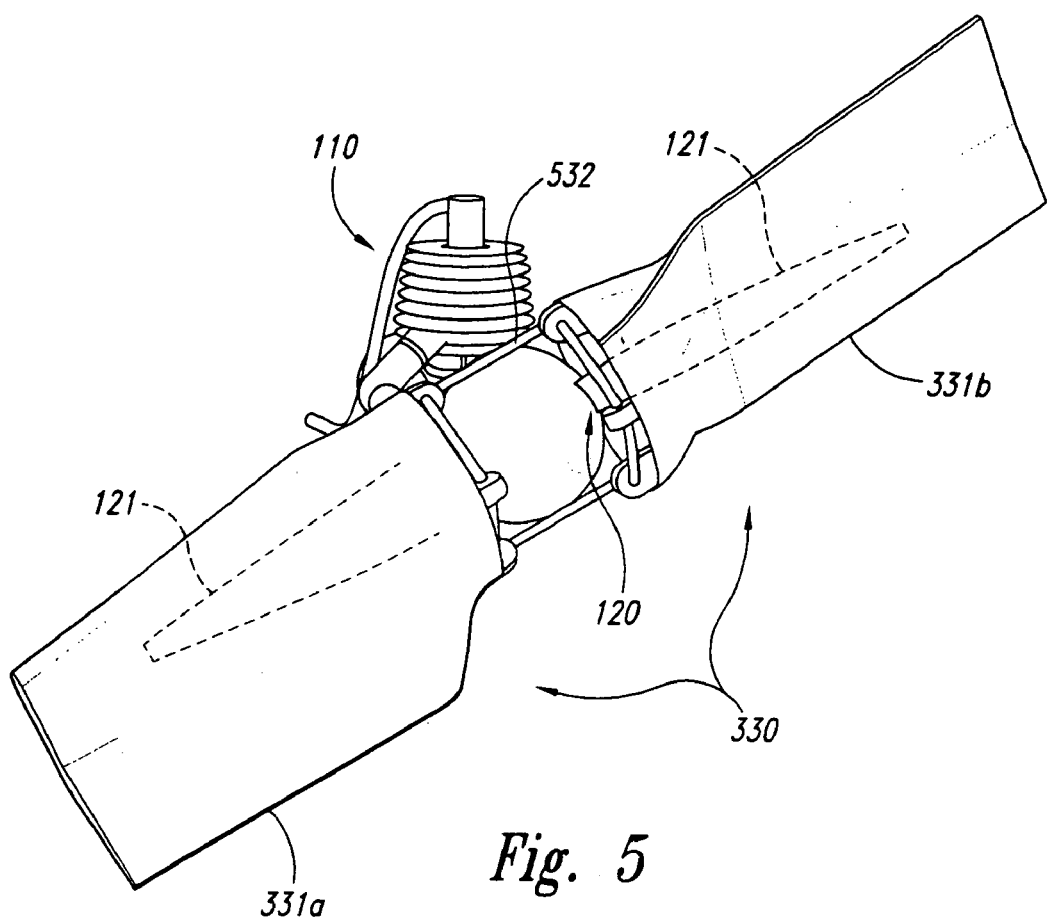
FIG. 5 illustrates a fixture having a paddle configuration with a single frangible line, wire, string or other linkage.

FIG. 4 shows the fixture 330 described above with reference to FIG. 3 after the frangible links 332a, 332b (FIG. 3) have broken. In one aspect of this embodiment, the strengths of the links 332a, 332b are the same so that they break at the same time. If they do not break at the same time, the propeller 120 will become unbalanced when the links 332a, 332b separate. This could cause the engine 110 to shake or undergo other dynamic action. If such an unbalance does not disturb the engine 110 or corresponding aircraft, an alternate embodiment of the fixture 330 includes only a single portion 331. An advantage of this arrangement is that the breaking strength of two frangible links need not be matched, and the weight of the fixture 330 can be reduced. If such an unbalance does disturb the engine 110 or the corresponding aircraft, the fixture can include two portions 331 and a single link, e.g., as described above with reference to FIGS. 1 and 2. FIG. 5 shows such a fixture 330 with a single frangible line, wire, string or other link 532. If the link 532 breaks anywhere along its length, then both fixture portions 331a, 331b will leave the propeller 120 at approximately the same time.

Figure 6:
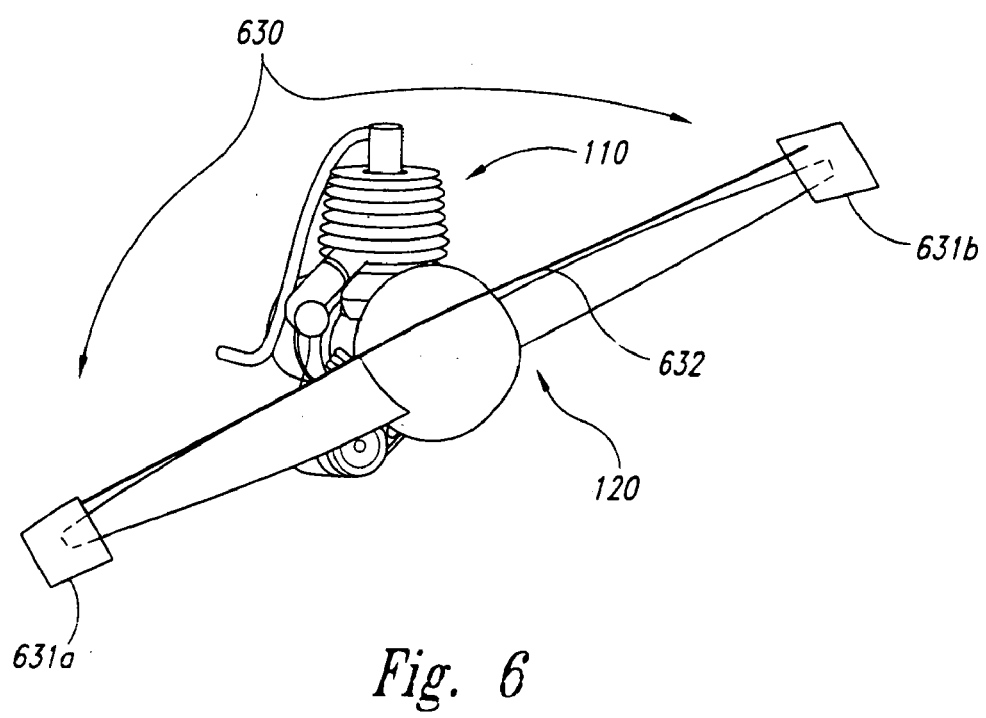
FIG. 6 illustrates a relatively small fixture positioned at the propeller tips to generate engine-starting torques.

FIG. 6 illustrates a fixture 630 having very small portions 631a, 631b at the tips of the propeller 120 in accordance with another embodiment of the invention. A pre-tensioned wire or other link 632 releasably secures the portions 631 to the propeller 120. When the link 632 breaks (at a pre-selected load), the portions 631 and the link 632 are jettisoned.

Figure 7:
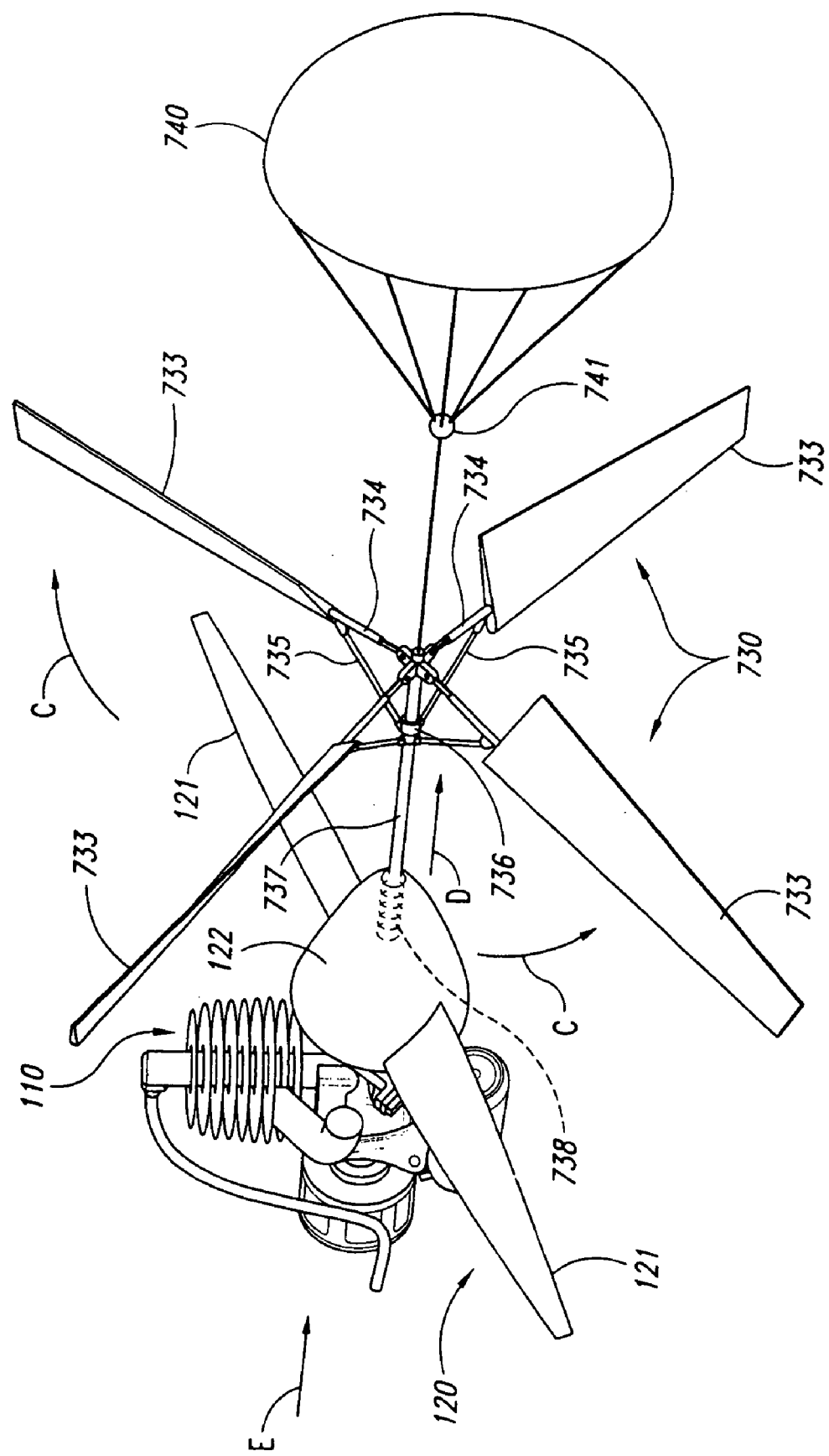
FIG. 7 illustrates another fixture having a spinner-umbrella configuration for helping to start propeller-driven devices.

FIG. 7 illustrates a fixture 730 configured to help start propeller-driven aerial vehicles in accordance with another embodiment of the invention. The fixture 730 has a "spinner-umbrella" configuration. Accordingly, the fixture 730 can include a shaft 737 screwed into the hub 122 (or another portion of the propeller 120) with threads 738. The fixture 730 can include vanes 733 that create large starting torques with no rotation velocity or low rotation velocities. The vanes 733 are attached to arms 734 that are pivotably attached to the shaft 737. Struts 735 are pivotably attached between each arm 734 and a slider 736 that slides along the shaft 737. When the airflow impinges on the fixture 730 (as indicated by arrow E), the vanes 733 can unfold (as indicated by arrows C) from a stowed position to a deployed position, while the slider 736 slides axially along the shaft 737 (as indicated by arrow D), generally in the manner of an opening umbrella. Once deployed, the vanes 733 can assist in starting the engine 110, in a manner generally similar to that described above with reference to FIGS. 1–6. Accordingly, the fixture 730 can be at least partially retracted along the shaft 737 prior to use so that it has a relatively small diameter. This umbrella-like retraction feature reduces the bulk of the corresponding airplane, allowing it to be more easily packaged into a small box or other confined area.

In one particularly useful embodiment, the fixture 730 is installed on an aircraft having a pusher configuration (e.g., with the engine 120 behind the fuselage). Accordingly, the airflow over the engine 120 helps to deploy the fixture 730. In other embodiments, the fixture 730 can be mounted to an aircraft having a tractor configuration (e.g., with the propeller 120 mounted forward of the fuselage) and can be deployed with other devices (e.g., a powered actuator). In any of these embodiments, the fixture 730 overcomes the static friction, dynamic or sliding friction, and compression resistance of the engine 110 to cause the propeller 120 to spin freely or windmill. Fuel is then added to the engine 110 and the engine 110 is started. Generally, the higher the rotational velocity imparted by the fixture 730, the quicker and more reliably the engine 110 will start.

In a particular aspect of an embodiment shown in FIG. 7, the orientation of the threads 738 on the shaft 737 can be chosen to aid both the process of starting the engine 110 and the process of jettisoning the fixture 730. For example, when the fixture 730 is powering the engine 110 during start-up, the rotating vanes 733 will tighten the threads 738. When the engine 110 is powering the propeller 120 (and the fixture 730) it will cause the propeller 120 to spin faster than the fixture 730 because the vanes 733 will have a high aerodynamic drag and will be applying a counter-torque to the rotation of the propeller 120 and the engine 110. The threads 738 will accordingly unscrew from the hub 122. Once the threads 738 have been unscrewed, the entire fixture 730 will be jettisoned or fall away. Put another way, while the fixture 730 is applying torque to start the engine 110, the torque serves to tighten the threaded connection. Once the engine 110 is started, the engine 110 applies an opposite torque to the fixture 730 which unscrews the threads 738, and releases the fixture 730. When the propeller 120 is mounted facing aft (e.g., in a pusher configuration), the fixture 730 jettisons in an aft direction.

One feature of the fixture 730 is that it will not depart in a radial direction from the propeller 120 but instead departs in a more axial or longitudinal direction. This feature may further reduce the likelihood for the wing-tips or other outboard structures of the corresponding aircraft to be damaged by the departing fixture 730.

In another aspect of an embodiment shown in FIG. 7, a parachute 740 can optionally be attached to the fixture 730. A swivel joint 741 between the parachute 740 and the fixture 730 prevents the rotational motion of the fixture 730 from rotating the parachute 740. When the fixture 730 is jettisoned after the engine 110 is successfully started, the parachute 740 is jettisoned along with it. If the engine start is unsuccessful, the parachute 740 remains attached to the fixture 730 (and therefore the engine 110 and the vehicle it powers) to reduce the decent speed of the vehicle and limit the potential damage incurred to the vehicle when it strikes the ground.

Figure 8A:
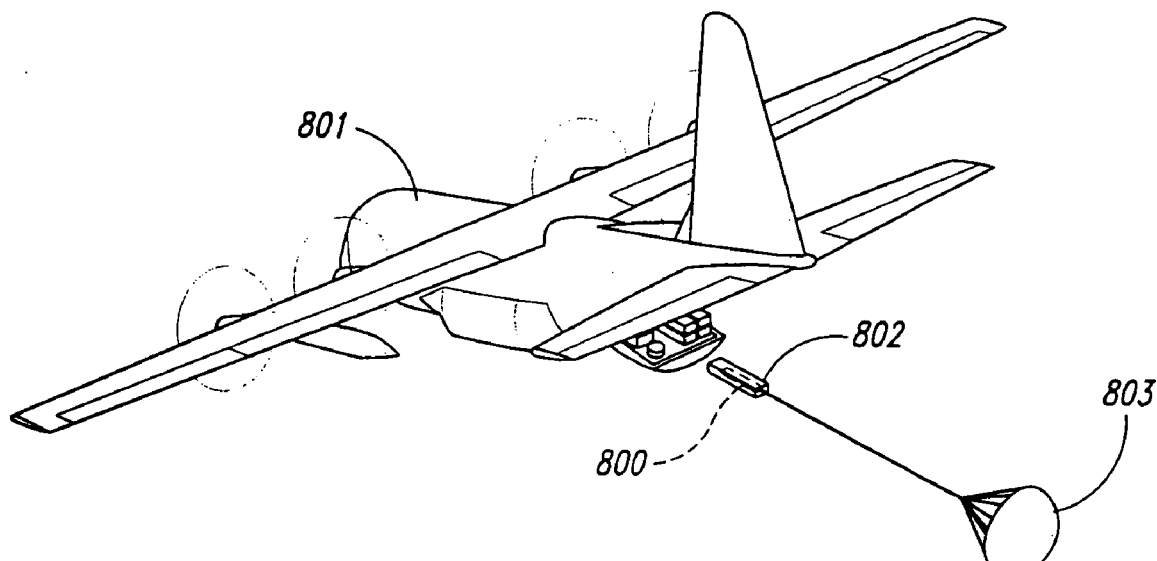
FIGS. 8A–8F illustrate a process for launching an aircraft, starting its engine and capturing the aircraft, in accordance with an embodiment of the invention.
Figure 8B:
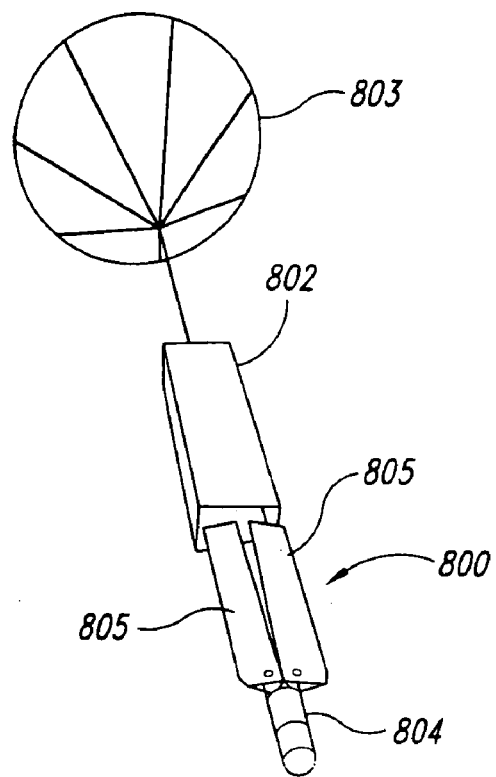
Figure 8C:
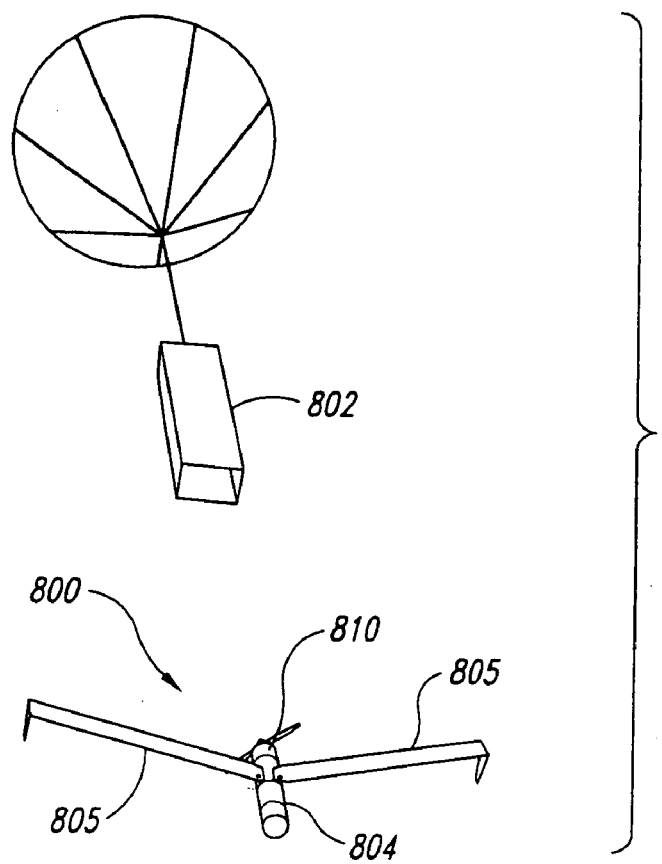
Figure 8D:
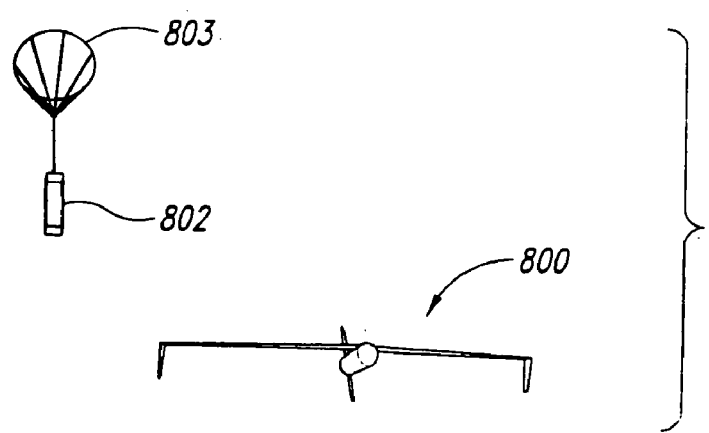

FIGS. 8A–8D show a method for deploying a UAV 800 in accordance with an embodiment of the invention. The UAV 800 can be stored in a canister 802 and the canister 802 can be either ejected from a launch vehicle 801 (e.g., another airplane) or pulled out by a launch parachute 803 (FIG. 8A). The UAV 800 is then deployed from the canister 802. In this case, the UAV 800 includes a fuselage 804 and wings 805 that are initially folded against the fuselage 804 (FIG. 8B). The wings 805 are then unfolded (FIG. 8C) and the aft-mounted engine 810 and propeller 820 are started using a fixture generally similar to any of those described above. After the engine 810 is started, the fixture departs the UAV 800 and the UAV 800 proceeds on course (FIG. 8D). The UAV 800 can include an airplane, missile, and or any flying vehicle powered by a propeller 820. The wings 805 can be initially folded as shown in FIG. 8B or unfolded. The wings 805 can be aft-swept (as show in FIG. 8C) or forward swept or unswept. The UAV 800 can have a tailless, single engine pusher-prop design (as shown in FIG. 8C) or another configuration (e.g., a biplane, triplane canard-bearing or other multi-surface configuration, and/or a tractor engine configuration, and/or a multiple engine configuration).

Figure 8E:
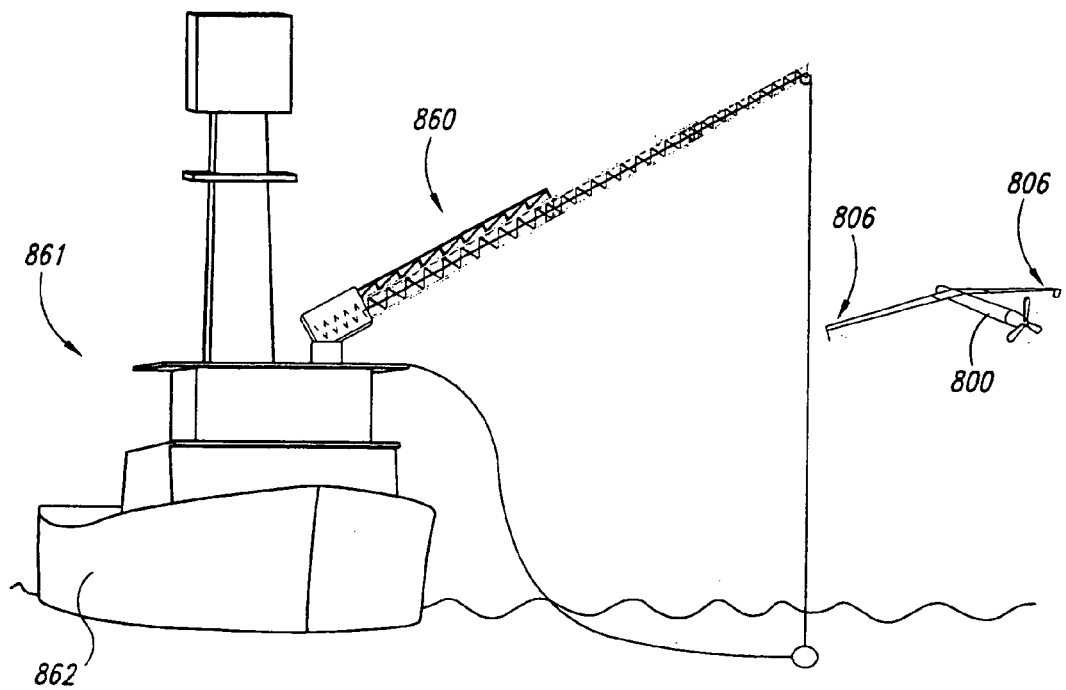
Figure 8F:
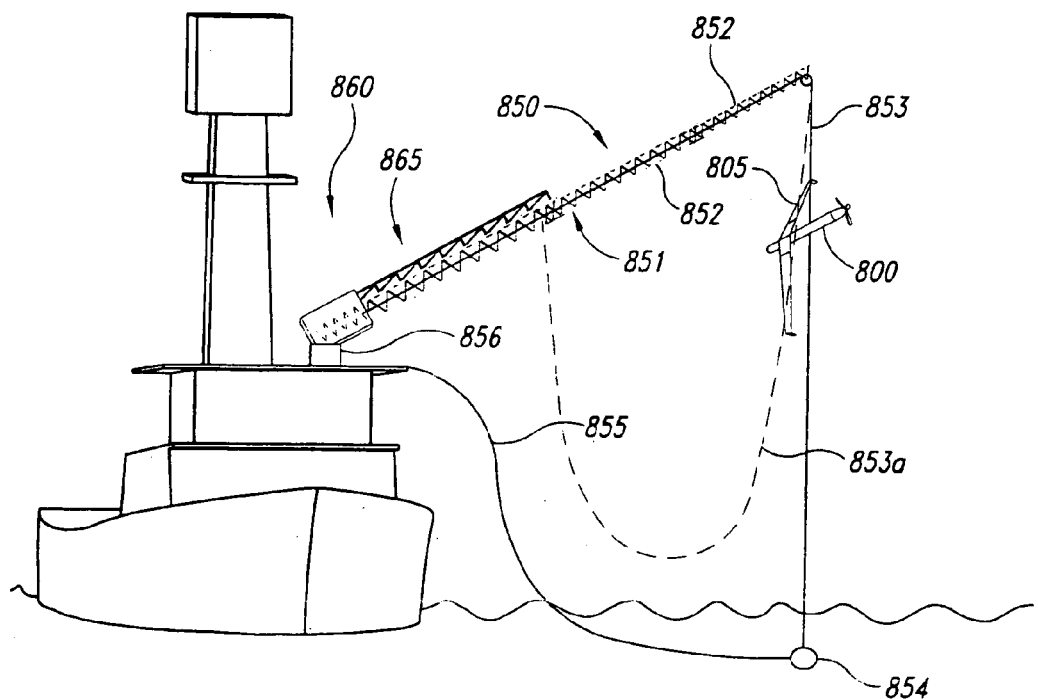

FIGS. 8E and 8F illustrate apparatuses and methods for capturing unmanned aircraft (including the UAV 800 described above) in accordance with several embodiments of the invention. Beginning with FIG. 8E, the UAV 800 can be captured by an aircraft handling system 860 positioned on a support platform 861. In one embodiment, the support platform 861 can include a boat 862 or other water vessel. In other embodiments, the support platform 861 can include other structures, including a building, a truck or other land vehicle, or an airborne vehicle, such as a balloon. In many of these embodiments, the aircraft handling system 860 can be configured solely to retrieve the UAV 800 or it can be configured to both launch and retrieve the UAV 800, as described in co-pending U.S. application Ser. No. 10/758,893, filed Jan. 16, 2004 and incorporated herein in its entirety by reference.

Referring now to FIG. 8B, the aircraft handling system 860 can include a recovery system 850 integrated with a launch system 865. In one aspect of this embodiment, the recovery system 850 can include an extendable and retractable boom 851 having a plurality of segments 852. The boom 851 can be mounted on a rotatable base 856 or turret for ease of positioning. The segments 852 are initially stowed in a nested or telescoping arrangement and are then deployed to extend outwardly as shown in FIG. 8F. In other embodiments, the boom 851 can have other arrangements, such as a scissors arrangement, a parallel linkage arrangement or a knuckle boom arrangement. In any of these embodiments, the boom 851 can include a recovery line 853 or other flexible capture member extended by gravity or other forces. In one embodiment, the recovery line 853 can include 0.25 inch diameter polyester rope, and in other embodiments, the recovery line 853 can include other materials and/or can have other dimensions. In any of these embodiments, a spring or weight 854 at the end of the recovery line 853 can provide tension in the recovery line 853. The aircraft handling system 860 can also include a retrieval line 855 connected to the weight 854 to aid in retrieving and controlling the motion of the weight 854 after the aircraft recovery operation has been completed. In another embodiment, a recovery line 853*a* can be suspended from one portion of the boom 851 and attachable to another point on the boom 851, in lieu of the recovery line 853 and the weight 854.

In any of the foregoing embodiments, the UAV 800 is captured when it flies into the recovery line 853. Accordingly, the UAV 800 can include a cleat or other capture device 806 positioned toward the tip of each wing 805. In other embodiments, the capture devices can be positioned on other lifting surfaces of the UAV 800, so long as the capture devices can engage with the recovery line 853 when the corresponding lifting surface strikes the recovery line 853. Once captured, the UAV 800 is suspended from the recovery line by the wing 805 (or other lifting surface). Further details of apparatuses and methods for capturing the aircraft are described in co-pending U.S. application Ser. No. 10/758,893, previously incorporated herein by reference.

In other embodiments, the fixtures described above can also have other configurations. For example, the fixture or fixture portions can be released by an actuator, e.g., a servo, electric motor, powered magnet, or any other actuation device or mechanism. The operator of the UAV can manually activate the actuator (e.g., by pushing a remote control button) or the actuator can be activated automatically after a pre-selected time period has elapsed. In other embodiments, other factors (e.g., engine RPM) can be used to determine when to automatically or manually jettison the fixture. In a particular embodiment, a microprocessor can determine when to activate the actuator and jettison the fixture.

The fixture can be made out of a number of materials including wood, metal, plastic, fiberglass, and/or a composite. The fixture can be flexible, rigid, or semi-rigid. The fixture can be carefully tailored to bend or deform as the engine rotation rate increases to improve its performance.

The propeller to which the fixture is attached can have a two, three, four or more blades. The fixture can include portions on all the blades or fewer than all the blades. Each fixture portion can cover an entire blade, or less than an entire blade (e.g., just the tip of the blade). In still further embodiments, the fixture can be used with variable pitch propellers. In this case, the fixture can reduce the required range of variable-pitch actuation, simplifying the variable-pitch mechanism.

In other embodiments, the fixture can be attached to devices other than aircraft. Examples include windmills, electric turbines, water turbines, propellers for watercraft, or fan stages for turbine engines. In any of these embodiments, the device includes a propeller, or propeller-like element that is started by wind or air blowing over it, and which requires an increased starting torque over that which would be provided by the propeller itself. The propeller itself can accordingly be optimized for operation at higher relative wind velocities, or rotational velocities, or both.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A vehicle, comprising:
   an external flow body;
   an engine coupled to the external flow body;
   a propeller coupled to the engine; and
   a removable fixture coupled to the propeller, the fixture having at least one portion positioned to extract energy from a flowstream adjacent to the external flow body to rotate the propeller during engine start-up, the fixture being configured to separate from the propeller while the propeller rotates.

2. The vehicle of claim 1 wherein the fixture is coupled to the propeller with a link.

3. The vehicle of claim 1 wherein the propeller includes a first blade and a second blade, and wherein the fixture includes a first portion attached to at least part of the first blade, and a second portion attached to at least part of the second blade.

4. The vehicle of claim 1 wherein the propeller includes a first blade and a second blade, and wherein the fixture includes a first portion attached to at least part of the first blade, and a second portion attached to at least part of the second blade, and wherein the first and second portions of the fixture are coupled to the propeller with a single releasable link.

5. The vehicle of claim 1 wherein the propeller includes a first blade and a second blade, and wherein the fixture includes a first portion attached to at least part of the first blade, and a second portion attached to at least part of the second blade, and wherein the first and second portions of the fixture are coupled to the propeller with a single frangible link.

6. The vehicle of claim 1 wherein the fixture includes a shaft threadably attached to the propeller, and wherein the fixture further includes a plurality of vane surfaces, each being hingedly coupled to the shaft, further wherein the threads are configured to tighten when the fixture imposes a net torque on the propeller and loosen when the propeller imposes a net torque on the fixture.

7. The vehicle of claim 1 wherein the removable fixture includes at least one aperture into which the propeller removably fits.

8. The vehicle of claim 1, further comprising a frangible link that releasably connects the removable fixture relative to the propeller.

9. The vehicle of claim 1, further comprising a frangible link that releasably connects the removable fixture relative to the propeller, and wherein the frangible link is configured to break under a threshold tensile force.

10. The vehicle of claim 1, further comprising a frangible link that releasably connects the removable fixture relative to the propeller, and wherein the frangible link includes a flexible elongated member configured to break under a threshold shear force.

11. The vehicle of claim 1, further comprising a frangible link that releasably connects the removable fixture relative to the propeller, the frangible link being configured to break under a centrifugal force when the propeller spins above a threshold speed.

12. The vehicle of claim 1 wherein the propeller projects aft from the external flow body.

13. The vehicle of claim 1 wherein the propeller projects forward from the external flow body.

14. The vehicle of claim 1, further comprising a deployable parachute coupled to the removable fixture.

15. The vehicle of claim 1 wherein the propeller includes a propeller blade and wherein the removable fixture includes a portion releasably attached to the propeller blade, the propeller blade having a first radial extent and a first circumferential extent, the portion of the fixture having a second radial extent and a second circumferential extent, with a ratio of the second circumferential extent to the second radial extent being larger than a ratio of the first circumferential extent to the first radial extent.

16. The vehicle of claim 1 wherein the external flow body includes an unmanned aircraft fuselage.

17. An apparatus for starting a propeller, comprising:
a removable fixture configured to be coupled to an engine-driven propeller, the fixture including:
at least one vane portion having an opening positioned to receive the propeller, and a generally rigid external surface configured to be exposed to a flowstream; and
at least one link configured to releasably couple the at least one vane portion to the propeller to rotate the propeller during engine start-up, the link being configured to release the at least one vane portion from the propeller when the propeller rotates.

18. The apparatus of claim 17, further comprising:
the propeller;
a reciprocating engine coupled to the propeller; and
an unmanned aircraft carrying the engine and the propeller.

19. The apparatus of claim 17, further comprising the propeller, and wherein the link is releasably connected between the propeller and the at least one vane portion.

20. The apparatus of claim 17 wherein the fixture includes a first portion configured to attach to a first blade of the propeller and a second portion configured to attach to a second blade of the propeller.

21. The apparatus of claim 17 wherein the fixture includes a threaded shaft configured to threadably attach to the propeller, and wherein the fixture further includes a plurality of vane surfaces, each being hingedly coupled to the shaft, further wherein the threads are configured to tighten when the fixture imposes a net torque on the propeller and loosen when the propeller imposes a net torque on the fixture.

22. The apparatus of claim 17 wherein the link is configured to break under a threshold tensile force.

23. The apparatus of claim 17 wherein the link is configured to break under a threshold shear force.

24. The apparatus of claim 17 wherein the link is configured to break under a centrifugal force when the propeller spins above a threshold speed.

25. The apparatus of claim 17, further comprising a deployable parachute coupled to the removable fixture.

26. An apparatus for starting a propeller, comprising:
a removable fixture configured to be coupled to an engine-driven propeller, the fixture including:
vane means for rotating the propeller in a flowstream flow, the vane means having an opening positioned to receive the propeller, and a generally rigid external surface; and
link means for releasably coupling the vane means to the propeller to rotate the propeller during engine start-up, the link means being configured to release the vane means from the propeller when the propeller rotates.

27. The apparatus of claim 26 wherein the link means is configured to break under a threshold tensile force.

28. The apparatus of claim 26 wherein the link means is configured to break under a threshold shear force.

29. The apparatus of claim 26 wherein the link means is configured to break under a centrifugal force when the propeller spins above a threshold speed.

30. An unmanned aircraft, comprising:
a fuselage having a forward portion and an aft portion;
a pair of wings coupled to the fuselage, each wing including a capture device configured to releasably engage a flexible line when the aircraft flies into the line;
an engine carried by the aft portion of the fuselage;
a propeller coupled to the engine and having a plurality of blades;
a releasable fixture coupled to the propeller, the fixture having a vane portion corresponding to each blade, each vane portion having an aperture positioned to receive a corresponding one of the blades, each vane portion being positioned to extend into an adjacent airstream adjacent to the aircraft to rotate the propeller during engine start-up; and
at least one frangible link coupling the vane portions to the propeller, the frangible link being configured to release the releasable fixture from the propeller when a rotation speed of the propeller exceeds a threshold value.

31. The aircraft of claim 30 wherein the link is configured to break under a threshold tensile force.

32. The aircraft of claim 30 wherein the link is configured to break under a threshold shear force.

33. The aircraft of claim 30 wherein the link includes a flexible, elongated member attached between the propeller and each of the vane portions.

34. A method for starting an engine coupled to a propeller, comprising:
rotating a propeller by exposing a starting fixture releasably coupled to the propeller to an adjacent fluid stream while the propeller and the starting fixture are airborne; and
releasing the starting fixture from the propeller after an engine coupled to the propeller begins to turn over.

35. The method of claim 34, the further comprising starting the engine before releasing the starting fixture.

36. The method of claim 34 wherein releasing the starting fixture includes releasing the starting fixture once a rotation rate of the propeller exceeds a threshold value.

37. The method of claim 34 wherein the propeller is carried by an aircraft and wherein the method further comprises:
launching the aircraft from an airborne vehicle prior to starting the engine; and
recovering the aircraft in flight by engaging a spanwise lifting surface of the aircraft with an elongated, flexible capture member and releasably attaching the spanwise lifting surface to the capture member.

38. The method of claim 34 wherein exposing a starting fixture includes exposing the starting fixture to an airstream.

39. The method of claim 34 wherein the engine includes a reciprocating engine and wherein the method further comprises starting the engine before releasing the starting fixture.

40. The method of claim 34 wherein releasing the starting fixture includes:

increasing a tensile force placed on a frangible link coupling the starting fixture to the propeller by increasing a rotation speed of the starting fixture;

breaking the frangible link; and allowing the starting fixture to release from the propeller in a generally radial direction.

41. The method of claim 34 wherein releasing the starting fixture includes:

increasing a shear force placed on a frangible link coupling the starting fixture to the propeller by increasing a rotation speed of the starting fixture;

shearing the frangible link; and allowing the starting fixture to release from the propeller in a generally radial direction.

42. The method of claim 34 wherein the starting fixture is threadably coupled to the propeller along an axis about which the propeller rotates, and wherein releasing the starting fixture includes:

unthreading the propeller from the starting fixture by increasing a rotation rate of the propeller; and allowing the starting fixture to release from the propeller in a generally axial direction.

43. A method for starting an unmanned aircraft engine coupled to a propeller, comprising:

releasably coupling vanes of a starting fixture to blades of the propeller;

rotating the propeller by exposing the vanes to an adjacent airstream while the unmanned aircraft is in flight;

once a rotation rate of the propeller exceeds a first threshold value, starting the engine, wherein the engine is a piston-driven, reciprocating internal combustion engine;

once the rotation rate of the propeller exceeds a second threshold value, breaking a frangible link between the propeller and the starting fixture; and allowing the vanes to separate from the propeller in a generally radial direction.

44. The method of claim 43 wherein releasably coupling the vanes to the propeller includes sliding each blade of the propeller into an aperture of a corresponding vane of the starting fixture, and attaching the frangible link between the starting fixture and the propeller.

45. The method of claim 43 wherein breaking a frangible link includes shearing the frangible link.

46. The method of claim 43 wherein breaking a frangible link includes causing the frangible link to fail in tension.

* * * * *